US010156266B2

(12) United States Patent
Campbell et al.

(10) Patent No.: US 10,156,266 B2
(45) Date of Patent: Dec. 18, 2018

(54) UNIVERSAL JOINT HAVING A RETAINER RING

(71) Applicant: ArvinMeritor Technology, LLC, Troy, MI (US)

(72) Inventors: Travis Campbell, Royal Oak, MI (US); Anthony Lentini, Armada, MI (US); Alex Sergiu Filimon, Sterling Heights, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 143 days.

(21) Appl. No.: 15/251,385

(22) Filed: Aug. 30, 2016

(65) Prior Publication Data

US 2018/0058508 A1    Mar. 1, 2018

(51) Int. Cl.
| F16D 3/40 | (2006.01) |
| F16D 3/38 | (2006.01) |
| F16D 3/41 | (2006.01) |
| F16C 19/38 | (2006.01) |
| F16C 33/66 | (2006.01) |
| F16C 11/02 | (2006.01) |
| F16C 17/04 | (2006.01) |
| F16C 19/48 | (2006.01) |
| F16C 21/00 | (2006.01) |
| F16C 33/10 | (2006.01) |

(52) U.S. Cl.
CPC ............ *F16D 3/385* (2013.01); *F16C 11/02* (2013.01); *F16C 17/04* (2013.01); *F16C 19/38* (2013.01); *F16C 19/48* (2013.01); *F16C 21/005* (2013.01); *F16C 33/1065* (2013.01); *F16C 33/6677* (2013.01); *F16D 3/41* (2013.01); *F16C 2361/41* (2013.01)

(58) Field of Classification Search
CPC .. F16D 3/385; F16D 3/41; F16C 19/38; F16C 33/6659; F16C 2361/41
USPC ..... 464/128, 130, 131, 133; 384/585, 905.1; 277/577
See application file for complete search history.

(56) References Cited

U.S. PATENT DOCUMENTS

| 2,773,366 A | * | 12/1956 | Slaght | F16C 33/7809 |
| | | | | 464/131 X |
| 3,138,942 A | * | 6/1964 | Kayser | F16C 33/7809 |
| | | | | 464/131 X |
| 4,021,085 A | * | 5/1977 | Willyard | F16C 33/7809 |
| | | | | 464/131 X |
| 5,813,916 A | | 9/1998 | Lentini et al. | |
| 6,454,656 B2 | | 9/2002 | Brissette et al. | |

(Continued)

FOREIGN PATENT DOCUMENTS

| FR | 1.195.688 | * | 11/1959 |
| SU | 619715 | * | 8/1978 |

OTHER PUBLICATIONS

Meritor, "Meritor Driveline Quick Reference Guide," Meritor Heavy Vehicle Systems, Derrimut, Victoria, Australia, Sep. 2013.

(Continued)

*Primary Examiner* — Greg Binda
(74) *Attorney, Agent, or Firm* — Brooks Kushman P.C.

(57) ABSTRACT

A universal joint having a retainer ring that secures a bearing cup to a cross shaft. A bearing cup retainer may secure the bearing cup to the retainer ring. A cross shaft retainer may secure the retainer ring to the cross shaft. A seal may extend from the body of the retainer ring to the cross shaft.

20 Claims, 6 Drawing Sheets

(56) References Cited

U.S. PATENT DOCUMENTS

| | | |
|---|---|---|
| 6,685,569 B2 | 2/2004 | Kurzeja et al. |
| 8,475,052 B2 | 7/2013 | Ostrander et al. |
| 8,490,986 B1 | 7/2013 | Ostrander et al. |

OTHER PUBLICATIONS

Meritor, Inc., "Meritor Driveline Components," Published prior to Aug. 30, 2016.

* cited by examiner

UNIVERSAL JOINT HAVING A RETAINER RING

TECHNICAL FIELD

This disclosure relates to a universal joint that has a retainer ring that may secure a bearing cup to a cross shaft.

BACKGROUND

A bearing assembly for a universal joint is disclosed in U.S. Pat. No. 5,813,916.

SUMMARY

In at least one embodiment, a universal joint is provided. The universal joint may include a cross shaft, a bearing module, a bearing cup, and a retainer ring. The cross shaft may have a trunnion. The bearing module may extend around the trunnion. The bearing cup may receive the bearing module and may be rotatable with respect to the trunnion. The retainer ring may secure the bearing cup to the cross shaft. The retainer ring may have a body and a seal. The body may include a support flange, a bearing cup retainer, and a cross shaft retainer. The support flange may engage the bearing module. The bearing cup retainer may secure the bearing cup to the retainer ring. The cross shaft retainer may secure the retainer ring to the cross shaft. The seal may extend from the body to the cross shaft.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
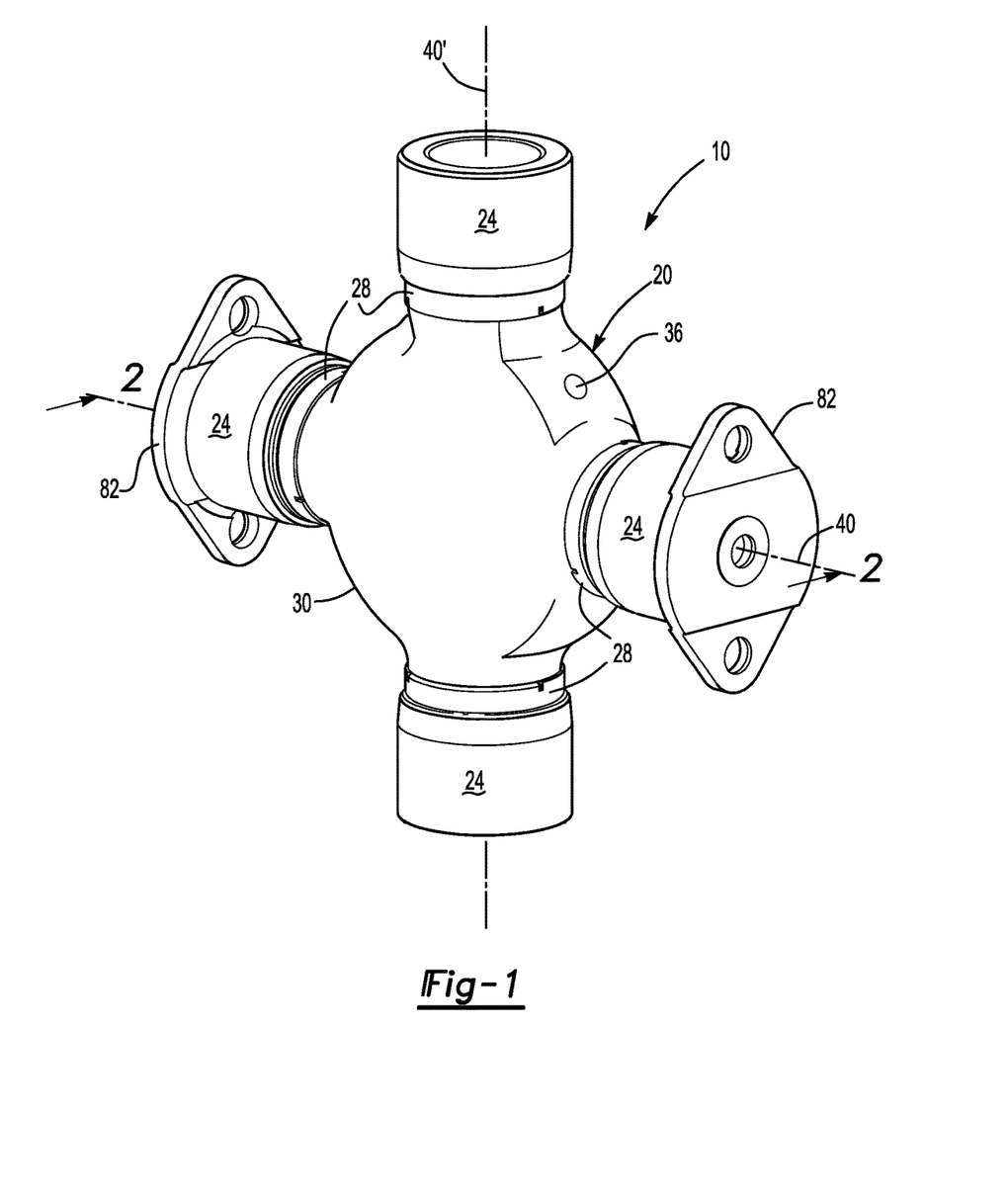
FIG. 1 is a perspective view of a universal joint.

Referring to FIG. 1, an example of a universal joint 10 is shown. The universal joint 10 may be provided with a motor vehicle like a truck, bus, farm equipment, mining equipment, military transport or weaponry vehicle, or cargo loading equipment for land, air, or marine vessels. The universal joint 10 may be provided to operatively connect rotatable components, such as rotatable components of a vehicle drivetrain. For instance, the universal joint 10 may operatively connect a vehicle drivetrain component, such as a drive shaft or a prop shaft, to an axle assembly, transfer case, or transmission. The universal joint 10 may also be provided as part of a constant-velocity (CV) joint.

Figure 2:
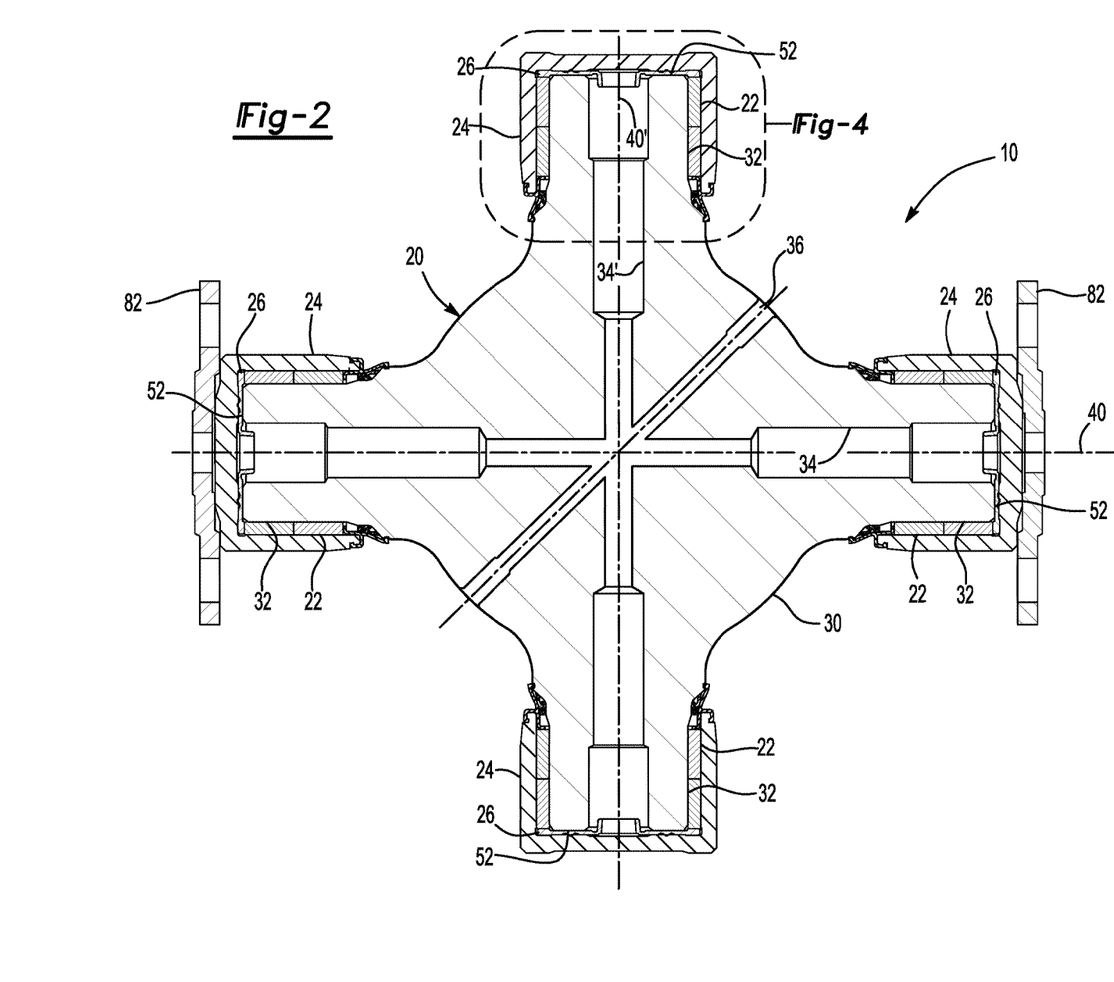
FIG. 2 is a section view of the universal joint along section line 2-2.

Referring to FIGS. 1 and 2, the universal joint 10 may include a cross shaft 20, a bearing module 22, a bearing cup 24, a thrust washer 26, and a retainer ring 28.

The cross shaft 20 may support the components of the universal joint 10. As is best shown in FIG. 2, the cross shaft 20 may include a hub 30, a plurality of trunnions 32, a first lubricant passage 34, a second lubricant passage 34', and a lubricant supply passage 36.

The hub 30 may be disposed at the center of the cross shaft 20. The hub 30 may at least partially define the first lubricant passage 34, the second lubricant passage 34', and the lubricant supply passage 36.

The trunnions 32 may extend from the hub 30. In the configuration shown in FIG. 2, four trunnions 32 are provided that may have substantially similar or identical configurations. The trunnions 32 may be arranged in pairs. The trunnions 32 that make up a pair may extend along a common axis. For instance, two trunnions 32 may extend in opposite directions from the hub 30 and may extend along a first axis 40. Similarly, two other trunnions 32 may extend in opposite directions from the hub 30 and may extend along a second axis 40'. The first axis 40 may intersect the second axis 40' proximate the center of the hub 30. In addition, the first axis 40 may be disposed substantially perpendicular to the second axis 40'. The first axis 40 and the second axis 40' may be substantially coplanar or may be disposed in a common plane.

Figure 3:
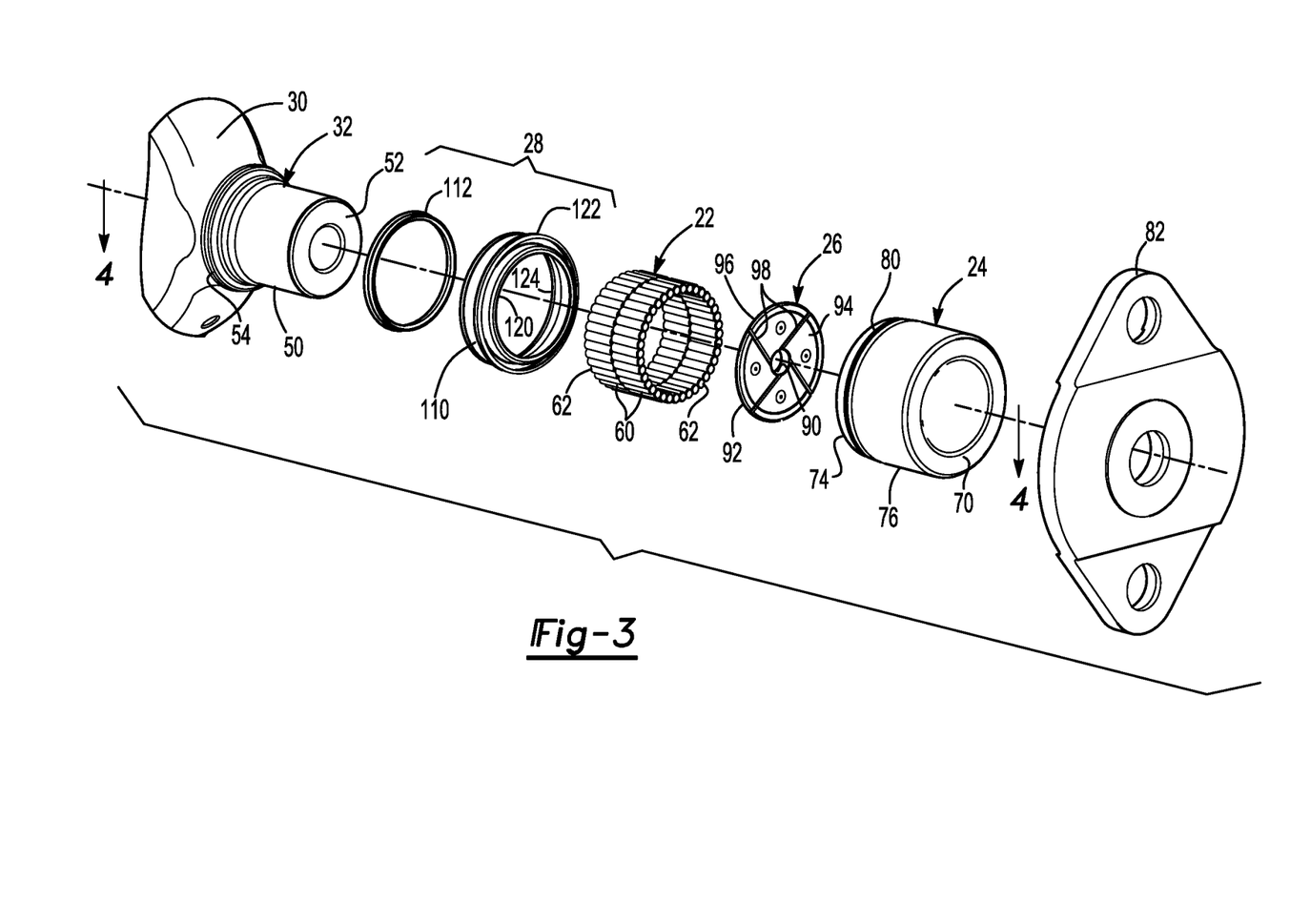
FIG. 3 is an exploded view of a portion of the universal joint that includes a retainer ring.
Figure 4:
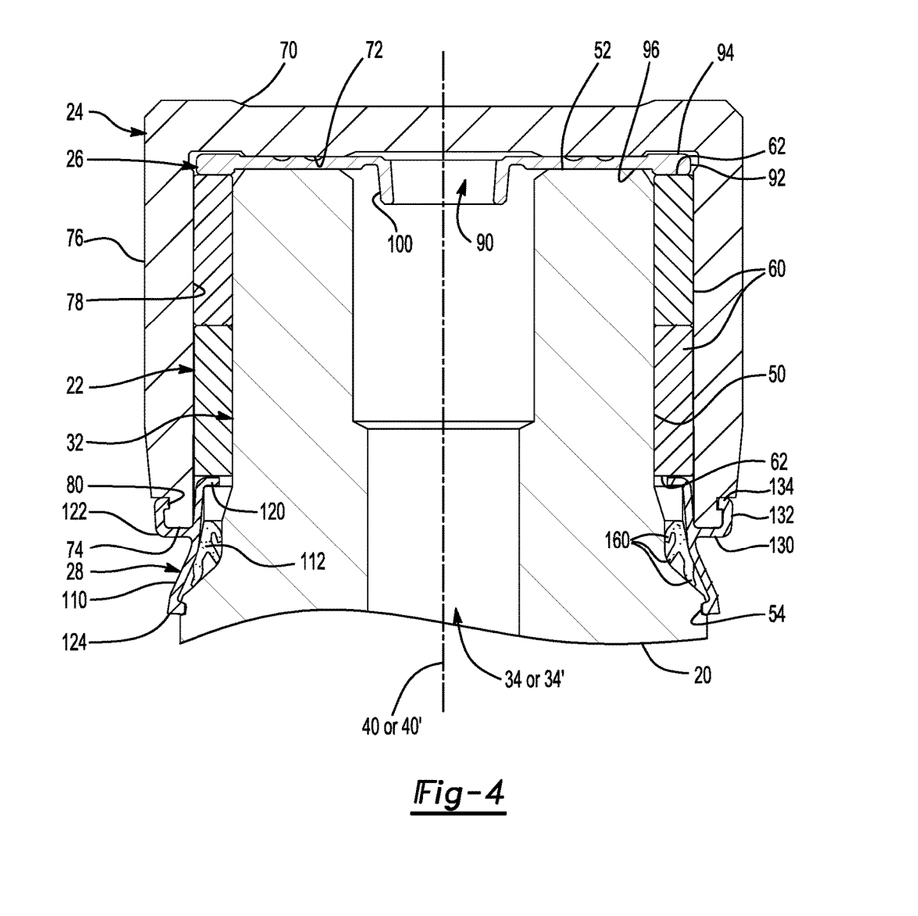
FIG. 4 is a magnified section view of the portion of the universal joint of FIGS. 2 and 3.

Each trunnion 32 may protrude from the hub 30. The trunnion 32 may provide a bearing surface that may facilitate rotation of the bearing module 22, the bearing cup 24, and optionally the thrust washer 26 with respect to the cross shaft 20. As is best shown in FIGS. 3 and 4, the trunnion 32 may include an outer trunnion surface 50 a trunnion end surface 52, and a trunnion groove 54.

The outer trunnion surface 50 may be a bearing surface that may facilitate rotation of the bearing module 22 and the bearing cup 24. The outer trunnion surface 50 may be radially disposed with respect to an associated axis 40, 40'. As such, the outer trunnion surface 50 may have a substantially cylindrical cross section. The outer trunnion surface 50 may extend around and may be disposed opposite an associated lubricant passage, such as the first lubricant passage 34 or the second lubricant passage 34'. In addition, the outer trunnion surface 50 may be received in the bearing cup 24.

The trunnion end surface 52 may be disposed at an end of the trunnion 32 and may support or engage the thrust washer 26. The trunnion end surface 52 may extend from the outer trunnion surface 50 toward an associated axis 40, 40'. More specifically, the trunnion end surface 52 may extend from the outer trunnion surface 50 to an associated lubricant passage, such as the first lubricant passage 34 or the second lubricant passage 34'. The trunnion end surface 52 may be disposed substantially perpendicular to an associated axis 40, 40'.

The trunnion groove 54 may facilitate coupling of the retainer ring 28 to the cross shaft 20 as will be discussed in more detail below. The trunnion groove 54 may be axially positioned between the hub 30 and the trunnion end surface 52. The trunnion groove 54 may extend around and extend toward an associated axis 40, 40'. In addition, the trunnion groove 54 may be radially disposed with respect to an associated axis 40, 40'. In at least one embodiment, the trunnion groove 54 may extend continuously around the trunnion 32 and an associated axis 40, 40'.

Referring to FIG. 2, the lubricant passage 34, 34' may extend through each trunnion 32. The lubricant passage 34, 34' may extend along an axis 40, 40' about which the trunnion 32 is disposed. For example, the first lubricant passage 34 may extend along the first axis 40 from one trunnion end surface 52 to an opposite trunnion end surface 52. Similarly, the second lubricant passage 34' may extend along the second axis 40' from one trunnion end surface 52 to an opposite trunnion end surface 52.

The first lubricant passage 34 may intersect the second lubricant passage 34'. For example, the first lubricant passage 34 may intersect the second lubricant passage 34' in the hub 30 proximate the center of the cross shaft 20.

One or more lubricant supply passages 36 may provide lubricant to the first lubricant passage 34 and the second lubricant passage 34'. The lubricant supply passage 36 may extend from an exterior surface of the cross shaft 20 to at least one lubricant passage 34, 34'. In the configuration shown in FIG. 2, a lubricant supply passage 36 is provided that extends through the hub 30 at an angle and intersects the first lubricant passage 34 and the second lubricant passage 34' proximate the center of the cross shaft 20. A fitting, such as a grease fitting or Zerk fitting, may be provided at an end of the lubricant supply passage 36. The fitting may act as a check valve that may allow lubricant to be injected through the fitting and into the lubricant supply passage 36. The lubricant supply passage 36 may then provide lubricant to the first lubricant passage 34 and the second lubricant passage 34'. The first lubricant passage 34 and the second lubricant passage 34' may then transport lubricant through the trunnion 32 and provide lubricant to one or more associated bearing modules 22.

Referring to FIGS. 2 and 3, the bearing module 22 may facilitate rotation of the bearing cup 24 with respect to the trunnion 32. The bearing module 22 may extend around the trunnion 32 and an associated axis 40, 40'. In addition, the bearing module 22 may extend from the thrust washer 26 to a support flange of the retainer ring 28 as will be discussed in more detail below.

Referring to FIGS. 3 and 4, the bearing module 22 may include a plurality of roller bearing elements 60 that may rotate about or with respect to the trunnion 32. The roller bearing elements 60 may be disposed on the outer trunnion surface 50 and may be received in the bearing cup 24. In addition, the roller bearing elements 60 may extend axially between the thrust washer 26 and the retainer ring 28. The roller bearing elements 60 may have any suitable configuration. For example, the roller bearing elements 60 may be configured as cylindrical roller bearings. In such a configuration, the roller bearing elements 60 may extend substantially parallel to an associated axis 40, 40'.

The roller bearing elements 60 may be provided in a single row or multiple rows that may be arranged along an associated axis 40, 40'. As is best shown in FIG. 3, the roller bearing elements 60 may have opposing end surfaces 62. The end surfaces 62 may be disposed substantially perpendicular to an associated axis 40, 40'. One end surface 62 of each roller bearing element 60 may face toward the thrust washer 26. An opposite end surface 62 of each roller bearing element 60 may face toward the retainer ring 28. As such, the thrust washer 26 and the retainer ring 28 may cooperate to limit or constraining axial movement of the roller bearing elements 60. In addition, the lubricant may be provided to the roller bearing elements 60 to reduce friction.

Referring to FIGS. 2-4, a bearing cup 24 may be rotatably disposed on each trunnion 32. As such, the bearing cup 24 may rotate about an associated axis 40, 40' with respect to the trunnion 32. In addition, the bearing cup 24 may rotate upon or with respect to the retainer ring 28. The bearing cup 24 may define a cavity that may at least partially receive the bearing module 22, thrust washer 26, and retainer ring 28. In at least one configuration, the bearing cup 24 may include an external end surface 70, an internal end surface 72, a rim surface 74, an outer surface 76, an inner surface 78, and a bearing cup groove 80.

Referring to FIGS. 3 and 4, the external end surface 70 may be disposed at an end of the bearing cup 24. The external end surface 70 may face away from the trunnion end surface 52.

Referring to FIGS. 1 and 2, an end cap 82 may optionally be disposed on the external end surface 70 of one or more bearing cups 24. The end cap 82 may help secure a yoke or other component that receives the bearing cup 24 to the universal joint 10.

Referring to FIG. 4, the internal end surface 72 may be disposed opposite the external end surface 70. The internal end surface 72 may extend from the inner surface 78 and may face toward the thrust washer 26 and the trunnion end surface 52. In addition, the internal end surface 72 may be axially positioned between the external end surface 70 and the rim surface 74. The internal end surface 72 may at least partially define the cavity of the bearing cup 24 that may at least partially receive the bearing module 22, thrust washer 26, and retainer ring 28. As such, the cavity of the bearing cup 24 may be configured as a blind hole in one or more embodiments.

Referring to FIGS. 3 and 4, the rim surface 74 may be disposed at an end of the bearing cup 24 that may be disposed opposite the external end surface 70. The rim surface 74 may extend around the trunnion 32 and may extend from the outer surface 76 to the inner surface 78. The rim surface 74 may at least partially define an opening of a cavity of the bearing cup 24. In addition, the rim surface 72 may engage the retainer ring 28.

The outer surface 76 may extend from the external end surface 70 to the rim surface 74. The outer surface 76 may extend around and may face away from the trunnion 32.

The inner surface 78 may extend from the internal end surface 72 to the rim surface 74. The inner surface 78 may face toward the trunnion 32 and may extend around the bearing module 22. Moreover, the inner surface 78 may engage the roller bearing elements 60 of the bearing module 22. The inner surface 78 may be radially disposed with respect to an associated axis 40, 40' and may at least partially define an inside circumference of the bearing cup 24.

The bearing cup groove 80 may facilitate coupling of the bearing cup 24 to the retainer ring 28 as will be discussed in more detail below. The bearing cup groove 80 may be axially disposed between the external end surface 70 and the rim surface 74. In addition, the bearing cup groove 80 may be positioned between the bearing module 22 and the rim surface 74. The bearing cup groove 80 may extend around a trunnion 32 and an associated axis 40, 40'. In at least one embodiment, the bearing cup groove 80 may extend continuously around the bearing cup 24.

The bearing cup groove 80 may extend from the outer surface 76 or the inner surface 78. In the configuration shown in FIG. 4, the bearing cup groove 80 extends from the outer surface 76 toward the inner surface 78. In the configuration shown in FIG. 6, the bearing cup groove 80' extends from the inner surface 78 toward the outer surface 76.

Referring to FIGS. 3 and 4, the thrust washer 26, which may also be called a thrust bearing, may be disposed in the bearing cup 24. The thrust washer 26 may be disposed between the bearing cup 24 and an end of the trunnion 32. More specifically, the thrust washer 26 may be disposed proximate and may engage the internal end surface 72 of the bearing cup 24 and the trunnion end surface 52. In addition, the thrust washer 26 may engage an end surface 62 of one or more roller bearing elements 60. As such, the thrust washer 26 may provide a bearing surface that supports a roller bearing element 60 and may limit or prevent axial movement of the roller bearing elements 60. The thrust washer 26 may be made of any suitable material, such as a polymeric material like nylon. In at least one embodiment, the thrust washer 26 may have a thrust washer hole 90, an outer thrust washer surface 92, a first thrust washer face surface 94, a second thrust washer face surface 96, and one or more lubricant grooves 98.

The thrust washer hole 90 may be disposed proximate the center of the thrust washer 26. The thrust washer hole 90 may extend around an associated axis 40, 40' and may allow lubricant to pass through the thrust washer 26 and enter a lubricant groove 98.

The outer thrust washer surface 92 may be disposed opposite the thrust washer hole 90. The outer thrust washer surface 92 may be disposed proximate and may engage the inner surface 78 of the bearing cup 24 and may be radially disposed with respect to an associated axis 40, 40'.

The first thrust washer face surface 94 may extend from the thrust washer hole 90 to the outer thrust washer surface 92. The first thrust washer face surface 94 may be disposed proximate and may engage the internal end surface 72 of the bearing cup 24.

Figure 6:
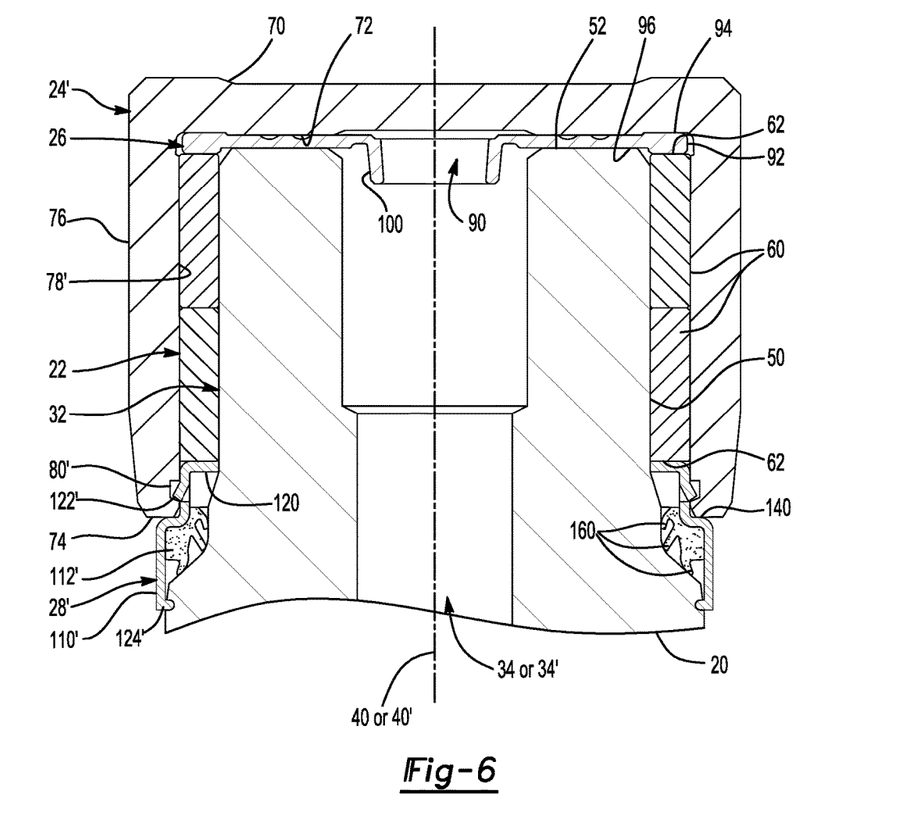
FIG. 6 is a section view of the portion of the universal joint of FIG. 5 along section line 6-6.

The second thrust washer face surface 96 may be disposed opposite the first thrust washer face surface 94. In addition, the second thrust washer face surface 96 or a portion thereof may be disposed substantially parallel to the first thrust washer face surface 94. The second thrust washer face surface 96 may extend from the outer thrust washer surface 92 toward the thrust washer hole 90. In at least one configuration such as is shown in FIGS. 4 and 6, the second thrust washer face surface 96 may extend from the outer thrust washer surface 92 to a thrust washer flange 100 that may be received in a corresponding lubricant passage 34, 34'.

Figure 5:
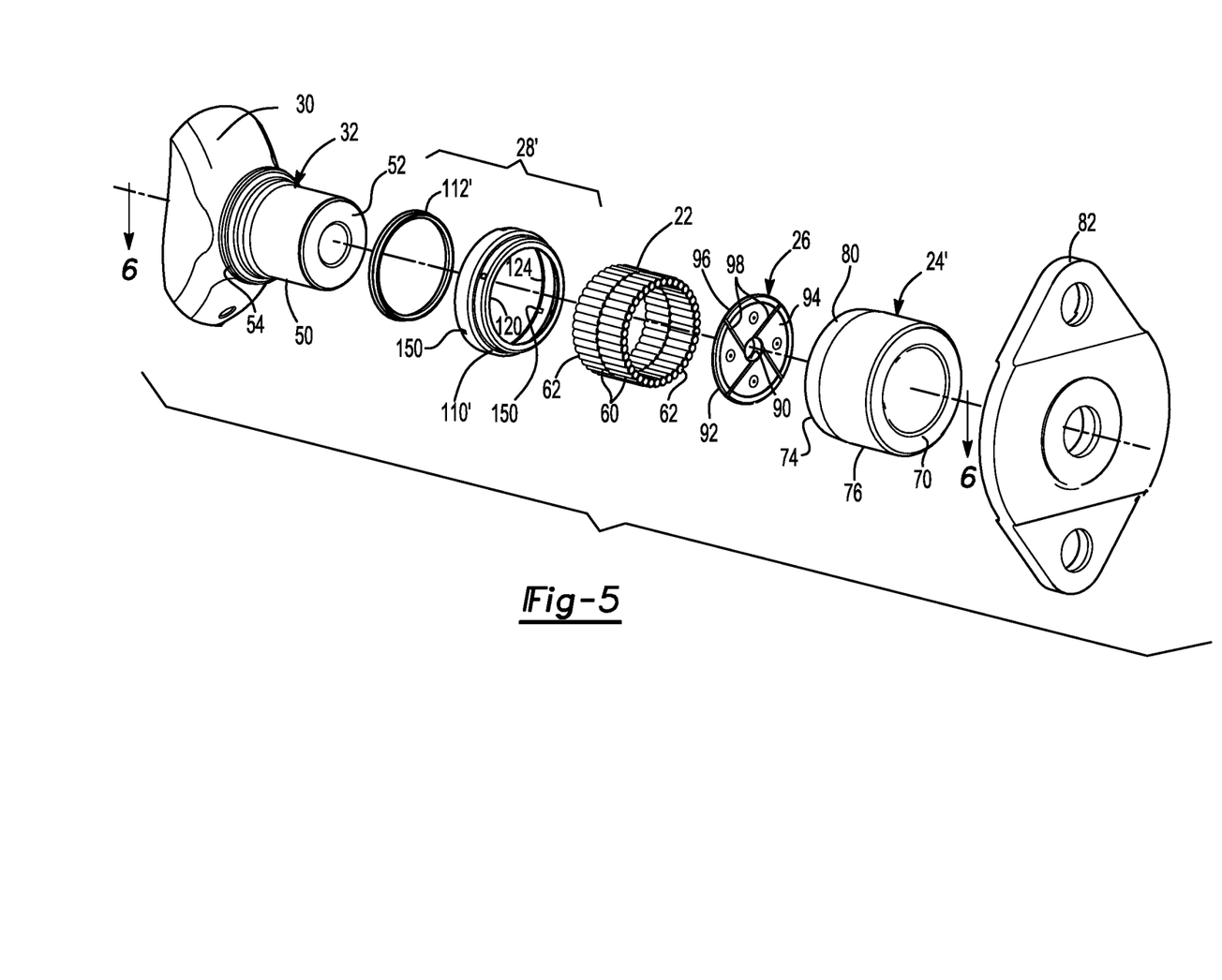
FIG. 5 is an exploded view of a portion of the universal joint that includes another configuration of a retainer ring.

Referring to FIGS. 3 and 5, one or more lubricant grooves 98 may be provided in the first thrust washer face surface 94, the second thrust washer face surface 96, or both face surfaces. The lubricant grooves 98 may extend from the thrust washer hole 90 toward or to the outer thrust washer surface 92 and may allow lubricant to pass from an associated lubricant passage 34, 34' to the bearing module 22. For instance, lubricant may enter a lubricant groove 98 at the thrust washer hole 90 and may pass through a gap between the outer thrust washer surface 92 and the internal end surface 72 of the bearing cup 24 to reach the roller bearing elements 60.

The lubricant grooves 98 may extend radially or non-radially from the thrust washer hole 90 toward the outer thrust washer surface 92. For instance, the lubricant grooves 98 may be disposed tangentially with respect to thrust washer hole 90 and may be linear or nonlinear. Lubricant grooves 98 in the first thrust washer face surface 94 may be offset from or not disposed directly opposite the lubricant grooves 98 in the second thrust washer face surface 96 to help improve the strength of the thrust washer 26 and/or improve lubricant distribution.

The retainer ring 28 may secure the bearing cup 24 to the cross shaft 20. In addition, the retainer ring 28 may help retain lubricant in the bearing cup 24 and inhibit contaminants from entering the bearing cup 24. In at least one configuration, the retainer ring 28 may have a body 110 and a seal 112.

Referring to FIGS. 3 and 4, the body 110 may be a structural member of the retainer ring 28. The body 110 may support the seal 112 and may couple the bearing cup 24 to the cross shaft 20. The body 110 may be generally configured as a ring that may extend continuously around a trunnion 32 and an associated axis 40, 40'. In at least one configuration, the body 110 may include a support flange 120, a bearing cup retainer 122, and a cross shaft retainer 124.

The support flange 120 may be disposed at an end of the body 110. For example, the support flange 120 may be disposed inside the bearing cup 24 and may extend toward the cross shaft 20 and the trunnion 32. In at least one configuration, the support flange 120 may be disposed substantially perpendicular with respect to the outer trunnion surface 50 and an associated axis 40, 40'.

The support flange 120 may be disposed proximate and may engage the bearing module 22. For instance, the support flange 120 may engage an end surface 62 of one or more roller bearing elements 60. As such, the support flange 120 may cooperate with the thrust washer 26 to inhibit axial movement of the bearing module 22.

The support flange 120 or a portion thereof may be spaced apart from and may not engage the trunnion 32. As such, a gap may be provided between an end of the support flange 120 and the trunnion 32 or the outer trunnion surface 50, that may allow excess lubricant to exit the universal joint 10 as will be discussed in more detail below.

The bearing cup retainer 122 may secure the bearing cup 24 to the retainer ring 28. For example, the bearing cup retainer 122 may be received in the bearing cup groove 80, 80' of the bearing cup 24. As such, the bearing cup retainer 122 may cooperate with the bearing cup groove 80, 80' to limit or inhibit axial movement of the bearing cup 24 with respect to the cross shaft 20. The bearing cup retainer 122 may be provided in various configurations.

In the configuration shown in FIGS. 3 and 4, the bearing cup retainer 122 may be disposed outside the bearing cup 24. As is best shown in FIG. 4, the bearing cup retainer 122 may at least partially wrap around the bearing cup 24 and hook back toward the cross shaft 20 and an associated trunnion 32. In such a configuration, the bearing cup retainer 122 may include a first portion 130, a second portion 132, and a third portion 134.

The first portion 130 may extend from the body 110 in a direction that extends away from the trunnion 32. For example, the first portion 130 may be disposed substantially perpendicular to an associated axis 40, 40' in one or more embodiments. The first portion 130 may be disposed proximate and may engage the rim surface 74 of the bearing cup 24.

The second portion 132 may extend from an end of the first portion 130 toward the external end surface 70 of the bearing cup 24 and may extend toward the bearing cup groove 80. The second portion 132 may be disposed proximate and may engage the outer surface 76 of the bearing cup 24.

The third portion 134 may extend from an end of the second portion 132. The third portion 134 may extend toward the trunnion 32 and may be received in the bearing cup groove 80. The third portion 134 may be disposed substantially perpendicular to an associated axis 40, 40' in one or more embodiments.

In the configuration shown in FIGS. 5 and 6, another configuration of a body 110' is shown. The body 110' may have similar attributes to the body 110 shown in FIGS. 3 and 4, but may be disposed inside the bearing cup 24. In this configuration, the bearing cup retainer 122 may be disposed inside the bearing cup 24 and may extend away from the cross shaft 20 and an associated trunnion 32. In such a configuration, the bearing cup retainer 122 may extend away from the trunnion 32 and may be received in the bearing cup groove 80'. In addition, the body 110' may include a step 140 as is best shown in FIG. 6.

The step 140 may be disposed adjacent to the bearing cup retainer 122 and may extend away from the trunnion 32. For example, the step 140 may extend substantially perpendicular to an associated axis 40, 40' in one or more embodiments. The step 140 may be disposed proximate and may engage the rim surface 74 of the bearing cup 24. In addition, the step 140 may be axially disposed between the rim surface 74 and the seal 112. As such, the step 140 may extend along and help position the seal 112.

The cross shaft retainer 124 may secure the retainer ring 28 to the cross shaft 20. For example, the cross shaft retainer 124 may be received in the trunnion groove 54. As such, the cross shaft retainer 124 may cooperate with the trunnion groove 54 to limit or inhibit axial movement and/or rotary movement of the retainer ring 28 with respect to the cross shaft 20.

The cross shaft retainer 124 may be disposed at an end of the body 110, 110' that may be disposed opposite the support flange 120. For example, the cross shaft retainer 124 may be disposed outside the bearing cup 24 and may extend toward and may engage the cross shaft 20 and the trunnion 32. As such, the cross shaft retainer 124 may be disposed further from the bearing module 22 than the support flange 120. The cross shaft retainer 124 may extend toward the trunnion 32 and may be disposed substantially parallel to the support flange 120 in one or more embodiments. In at least one configuration, the cross shaft retainer 124 may be disposed substantially perpendicular with respect to an associated axis 40, 40'. The cross shaft retainer 124 may be spaced apart from the seal 112 but may limit or help block contaminants from entering the retainer ring 28 and reaching the seal 112.

Referring to FIG. 5, one or more slots 150 may be provided in the cross shaft retainer 124 that may permit excess lubricant to exit the retainer ring 28 as will be discussed in more detail below.

Referring to FIGS. 3-6, the seal 112 may extend from the body 110, 110' to the trunnion 32. The seal 112 may be configured as a ring that may extend completely around the trunnion 32. The seal 112 may help retain lubricant within the cavity of the bearing cup 24 and may inhibit contaminants from getting past the seal 112 and entering the cavity of the bearing cup 24. The seal 112 may extend from the body 110, 110' to the cross shaft 20. As is best shown in FIGS. 4 and 6, the seal 112 may be axially positioned between the support flange 120 and the cross shaft retainer 124. In the embodiment shown in FIGS. 3 and 4, the seal 112 may be disposed directly opposite the bearing cup retainer 122. In the configuration shown in FIGS. 5 and 6, the seal 112 may be axially disposed between the bearing cup retainer 122 and the cross shaft retainer 124 and may be disposed on the step 140.

The seal 112 may be made of any suitable material, such as rubber or a polymeric material. The seal 112 may include one or more lips 160 that extend toward and engage the trunnion 32. The lips 160 may provide multiple points of contact or contact surfaces between the seal 112 and the trunnion 32. In addition, the lips 160 may be configured to flex to permit excess lubricant to pass between the lips 160 and the trunnion 32 and to exit the retainer ring 28 through one or more slots 150 in the body 110, 110'.

The seal 112 may be overmolded onto a portion of the retainer ring 28 in one or more embodiments or may be attached to the retainer ring 28 in any suitable manner, such as with an adhesive or mechanical attachment. As such, the seal 112 may be fixedly disposed on the body 110, 110' and may not rotate with respect to the body 110, 110'.

The universal joint configurations described above may allow a retainer ring to be provided as an integral or one piece component, which may simplify material handling and assembly operations as compared to a design having a seal and a deflector that are separate components and that are installed separately.

In addition, universal joint configurations described above may eliminate additional retaining devices, such as wires or twist ties, that may be provided to secure the bearing cup to the cross shaft during packaging and shipping i universal joints that do not have a retainer ring or deflector that secures the bearing cup.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A universal joint comprising:
   a cross shaft having a trunnion;
   a bearing module that extends around the trunnion;
   a bearing cup that receives the bearing module and is rotatable with respect to the trunnion; and
   a retainer ring that secures the bearing cup to the cross shaft, the retainer ring having:
     a body that includes:
       a support flange that engages the bearing module;
       a bearing cup retainer that secures the bearing cup to the retainer ring, wherein the bearing cup retainer extends away from the cross shaft; and
       a cross shaft retainer that secures the retainer ring to the cross shaft, wherein the support flange and the cross shaft retainer are disposed at opposite ends of the body; and
     a seal that extends from the body to the cross shaft.

2. The universal joint of claim 1 wherein the support flange is disposed inside the bearing cup and extends toward and is spaced apart from the trunnion.

3. The universal joint of claim 1 wherein the support flange is disposed in the bearing cup and the cross shaft retainer is disposed outside the bearing cup.

4. The universal joint of claim 3 wherein the support flange and the cross shaft retainer extend toward the cross shaft and are disposed substantially parallel to each other.

5. The universal joint of claim 1 wherein the cross shaft has a trunnion groove that receives the cross shaft retainer.

6. The universal joint of claim 5 wherein the cross shaft retainer is a ring that is disposed inside the body and extends continuously around the cross shaft.

7. The universal joint of claim 1 wherein the bearing cup has a bearing cup groove that receives the bearing cup retainer.

8. The universal joint of claim 7 wherein the bearing cup groove extends continuously around the bearing cup.

9. The universal joint of claim 7 wherein the bearing cup has an end surface, a rim surface disposed opposite the end surface, and an outer surface that extends from the end surface to the rim surface and that extends around and faces away from the cross shaft, wherein the bearing cup groove is disposed on the outer surface.

10. The universal joint of claim 9 wherein the bearing cup retainer includes a first portion that extends from the body and engages the rim surface, a second portion that extends toward the end surface, and a third portion that extends toward the cross shaft and is received in the bearing cup groove.

11. The universal joint of claim 1 wherein the seal is disposed between the support flange and the cross shaft retainer.

12. The universal joint of claim 11 wherein the seal is disposed opposite the bearing cup retainer.

13. The universal joint of claim 1 wherein the bearing cup has an inner surface that engages the bearing module and a bearing cup groove that extends from the inner surface and receives the bearing cup retainer.

14. A universal joint comprising:
a cross shaft having a trunnion;
a bearing module that extends around the trunnion;
a bearing cup that receives the bearing module and is rotatable with respect to the trunnion; and
a retainer ring that secures the bearing cup to the cross shaft, the retainer ring having:
a body that includes:
a support flange that engages the bearing module;
a bearing cup retainer that secures the bearing cup to the retainer ring, wherein the bearing cup retainer extends away from the cross shaft; and
a cross shaft retainer that secures the retainer ring to the cross shaft;
a seal that extends from the body to the cross shaft; and
a thrust washer that is disposed in the bearing cup between the bearing cup and an end of the trunnion, wherein the bearing module extends from the thrust washer to the support flange.

15. The universal joint of claim 14 wherein the bearing module includes a plurality of roller bearing elements that rotate about the trunnion, wherein the support flange engages an end surface of the roller bearing elements.

16. The universal joint of claim 14 wherein the support flange and the cross shaft retainer are disposed at opposite ends of the body.

17. A universal joint comprising:
a cross shaft having a trunnion;
a bearing module that extends around the trunnion;
a bearing cup that receives the bearing module and is rotatable with respect to the trunnion, wherein the bearing cup has a bearing cup groove; and
a retainer ring that secures the bearing cup to the cross shaft, the retainer ring having:
a body that includes:
a support flange that engages the bearing module;
a bearing cup retainer that secures the bearing cup to the retainer ring, wherein the bearing cup retainer extends away from the cross shaft; and
a cross shaft retainer that secures the retainer ring to the cross shaft; and
a seal that extends from the body to the cross shaft;
wherein the bearing cup groove and the bearing cup retainer are disposed inside the bearing cup and the bearing cup groove receives the bearing cup retainer.

18. The universal joint of claim 17 wherein the bearing cup has an end surface, a rim surface disposed opposite the end surface, an outer surface that extends from the end surface to the rim surface and that extends around and faces away from the cross shaft, and an inner surface that is disposed opposite the outer surface and that engages the bearing module, wherein the body includes a step that is disposed on the rim surface and is disposed between the rim surface and the seal.

19. The universal joint of claim 18 wherein the bearing cup groove extends from the inner surface.

20. A universal joint comprising:
a cross shaft having a trunnion;
a bearing module that extends around the trunnion;
a bearing cup that receives the bearing module and is rotatable with respect to the trunnion; and
a retainer ring that secures the bearing cup to the cross shaft, the retainer ring having:
a body that includes:
a support flange that engages the bearing module;
a bearing cup retainer that secures the bearing cup to the retainer ring, wherein the bearing cup retainer extends away from the cross shaft; and
a cross shaft retainer that secures the retainer ring to the cross shaft; and
a seal that extends from the body to the cross shaft, wherein the seal is disposed between the support flange and the cross shaft retainer and the seal is disposed between the bearing cup retainer and the cross shaft retainer.

* * * * *